(12) United States Patent
Konishi et al.

(10) Patent No.: US 9,083,026 B2
(45) Date of Patent: Jul. 14, 2015

(54) ELECTROLYTE MEMBRANE-ELECTRODE ASSEMBLY FOR DIRECT METHANOL FUEL CELL

(75) Inventors: Shigeru Konishi, Annaka (JP); Hiroshi Matsukawa, Annaka (JP); Nobuo Kawada, Annaka (JP); Toshio Ohba, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1696 days.

(21) Appl. No.: 12/304,061

(22) PCT Filed: May 23, 2007

(86) PCT No.: PCT/JP2007/060517
§ 371 (c)(1),
(2), (4) Date: Dec. 9, 2008

(87) PCT Pub. No.: WO2007/142031
PCT Pub. Date: Dec. 13, 2007

(65) Prior Publication Data
US 2010/0248071 A1    Sep. 30, 2010

(30) Foreign Application Priority Data
Jun. 9, 2006  (JP) ................. 2006-160659

(51) Int. Cl.
*H01M 4/02* (2006.01)
*H01M 8/10* (2006.01)
(Continued)

(52) U.S. Cl.
CPC .............. *H01M 8/1011* (2013.01); *H01M 4/92* (2013.01); *H01M 4/921* (2013.01); *H01M 4/926* (2013.01);
(Continued)

(58) Field of Classification Search
CPC ............... H01M 2250/30; H01M 2300/0082; H01M 4/92; H01M 4/921; H01M 4/926; H01M 8/1011; H01M 8/1072; H01M 8/1037; H01M 8/0234; Y02B 90/18; Y02E 60/523

USPC ......... 429/482–485, 521, 523, 524, 530, 479, 429/492, 526
See application file for complete search history.

(56) References Cited

U.S. PATENT DOCUMENTS

2003/0008197 A1* 1/2003 Gorer ............................. 429/40
2004/0234839 A1* 11/2004 Wakizoe et al. ................ 429/42
(Continued)

FOREIGN PATENT DOCUMENTS

| JP | 2001 283635 | 10/2001 |
| JP | 2001 348439 | 12/2001 |

(Continued)

OTHER PUBLICATIONS

Liu, Li et al., "Carbon supported and unsupported Pt-Ru anodes for liquid feed direct methanol fuel cells", Electrochimica Acta, vol. 43, No. 24, pp. 3657-3663, (1998).

(Continued)

*Primary Examiner* — Patrick Ryan
*Assistant Examiner* — Ben Lewis
(74) *Attorney, Agent, or Firm* — Oblon, McClelland, Maier & Neustadt, L.L.P.

(57) ABSTRACT

Disclosed is an electrolyte membrane-electrode assembly for direct methanol fuel cells, wherein a solid polymer electrolyte membrane is held between a pair of electrodes each composed of a catalyst layer coated over and/or impregnated in a porous supporting body. This electrolyte membrane-electrode assembly for direct methanol fuel cells is characterized in that the solid polymer electrolyte membrane is obtained by irradiating a resin membrane with radiation and graft-polymerizing a radically polymerizable monomer. The electrolyte membrane-electrode assembly for direct methanol fuel cells is further characterized in that the catalyst layer of the anode electrode comprises a catalyst, wherein platinum group metal or platinum-containing alloy particles having a particle size of 5 nm or less are supported by carbon particles, and a solid polymer electrolyte, and the noble metal amount in the catalyst layer of the anode electrode is not more than 5 mg/cm$^2$. By using such a catalyst, there can be obtained a direct methanol fuel cell wherein high output is achieved by using high methanol concentration.

18 Claims, 1 Drawing Sheet

(51) Int. Cl.
*H01M 4/92* (2006.01)
*H01M 8/02* (2006.01)

(52) U.S. Cl.
CPC .......... *H01M 8/1072* (2013.01); *H01M 8/0234* (2013.01); *H01M 8/1037* (2013.01); *H01M 2250/30* (2013.01); *H01M 2300/0082* (2013.01); *Y02B 90/18* (2013.01); *Y02E 60/523* (2013.01)

(56) References Cited

U.S. PATENT DOCUMENTS

| | | |
|---|---|---|
| 2005/0112439 A1 | 5/2005 | MacKinnon et al. |
| 2005/0147867 A1 | 7/2005 | Cooper et al. |
| 2005/0181254 A1 | 8/2005 | Uensal et al. |
| 2006/0105216 A1 | 5/2006 | Nagai et al. |
| 2006/0159982 A1* | 7/2006 | Yoshitake et al. ............... 429/44 |
| 2007/0059585 A1* | 3/2007 | Yoo et al. ........................ 429/44 |

FOREIGN PATENT DOCUMENTS

| | | |
|---|---|---|
| JP | 2002 313364 | 10/2002 |
| JP | 2002 532833 | 10/2002 |
| JP | 2003 82129 | 3/2003 |
| JP | 2005 71694 | 3/2005 |
| JP | 2005 268114 | 9/2005 |
| JP | 2005 526875 | 9/2005 |
| JP | 2005 527948 | 9/2005 |
| JP | 2006 19028 | 1/2006 |
| JP | 2006 32163 | 2/2006 |
| JP | 2006 100194 | 4/2006 |
| JP | 2006 140086 | 6/2006 |
| JP | 2006 313659 | 11/2006 |
| WO | WO 2005/001037 A2 | 1/2005 |
| WO | 2005 036687 | 4/2005 |
| WO | 2005 088748 | 9/2005 |
| WO | WO 2006/006607 A1 | 1/2006 |

OTHER PUBLICATIONS

Chen, C.Y. et al., "Fabrication of electrocatalyst layers for direct methanol fuel cells", Journal of Power Sources, Elsevier, vol. 141, pp. 24-29, (2005).

Deng, Q et al., "(Nafion/(SiO$_2$, Ormosil, and Dimethylsiloxane) Hybrids Via In Situ Sol-Gel Reactions: Characterization of Fundamental Properties)", Journal of Applied Polymer Science, vol. 68, pp. 747-763, (1998).

Extended European Search Report issued Jun. 29, 2011, in Patent Application No. 07743951.

Japanese Office Action issued Dec. 7, 2011, in Patent Application No. 2006-160659.

* cited by examiner

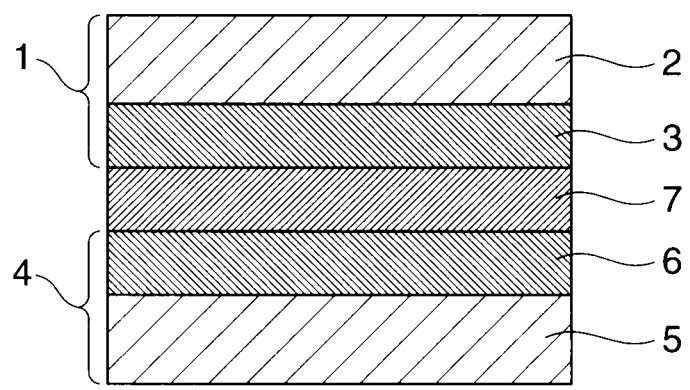

ELECTROLYTE MEMBRANE-ELECTRODE ASSEMBLY FOR DIRECT METHANOL FUEL CELL

TECHNICAL FIELD

This invention relates to an electrolyte membrane-electrode assembly for direct methanol fuel cells (DMFCs).

BACKGROUND ART

For mobile phones, batteries with a higher capacity are desirable. Since it is difficult to increase the capacity of secondary batteries, direct methanol fuel cells using methanol fuel become of greater interest.

While polymer electrolyte fuel cells (PEFCs) functioning on hydrogen fuel generally use Nafion (trademark, DuPont) membranes, the performance of DMFC is evaluated using the Nafion membrane.

Exemplary DMFCs using Nafion membranes include the following.

(1) Li Liu et al., Electrochimica Acta 43 (24), 3657-3663, 1998,
- membrane type: Nafion 117
- anode catalyst type: PtRu/C, PtRu black,
- PtRu loading 0.26-6 mg/cm$^2$
- cathode catalyst type: Pt black, Pt loading 6 mg/cm$^2$ (2) C. Y. Chen et al., Journal of Power Sources, 141, 24-29, 2005
- membrane type: Nafion 117
- anode catalyst type: 60 wt % PtRu/C, PtRu black,
- PtRu loading 1-8 mg/cm$^2$
- cathode catalyst type: 60 wt % Pt/C, Pt black,
- Pt loading 1-10 mg/cm$^2$ To incorporate DMFC in mobile phones, the DMFC is desired to have a higher methanol concentration (e.g., 10M or higher) and required to produce a higher power.

The Nafion membrane used therein has a substantial methanol crossover and allows methanol to permeate therethrough, suffering from the problems of power decline and a lower utilization efficiency of methanol fuel.

Therefore, among Nafion membranes, Nafion 117 having a substantial thickness (175 µm thick) is often utilized. As further power enhancement is required, a membrane which is reduced in methanol crossover without losing ion conductivity is desirable.

The technology pertaining to the present invention is described in the following references.
- Patent Reference 1: JP-A 2001-348439
- Patent Reference 2: JP-A 2002-313364
- Patent Reference 3: JP-A 2003-82129
- Non-patent Reference 1: Journal of Applied Polymer Science, Vol. 68, 747-763 (1998)

DISCLOSURE OF THE INVENTION

Problem to Be Solved by the Invention

An object of the invention, which was made under the above-discussed circumstances, is to provide an electrolyte membrane-electrode assembly for direct methanol fuel cells which enables to increase a catalyst content and hence the power.

Means for Solving the Problem

Making extensive investigations to attain the above object, the inventors have discovered that a radiation grafted membrane used as a solid polymer electrolyte membrane has a lower methanol crossover and thus enables to produce a higher power relative to the use of Nafion, and that by graft polymerizing radical polymerizable monomers including an alkoxysilane to the radiation grafted membrane, a silane-crosslinked membrane is formed which enables to further increase the power relative to the use of the radiation grafted membrane. While a higher loading of PtRu or Pt catalyst is necessary to further increase the power, an increase of power is achievable using as the catalyst layer of the anode a catalyst having fine particles of platinum group metal or platinum alloy with a particle size of up to 5 nm supported on carbon particles, and preferably a catalyst obtained by creating primary metal particles with a particle size of 0.1 to 2 nm on carbon particles, and then loading or growing other metal particles with a particle size of up to 4 nm on surfaces of the primary metal particles.

More specifically, prior art fuel cells use anode catalysts having low activity and must bear more amounts of catalysts in order to produce more amounts of power. Research efforts to increase the activity of anode catalysts were made on systems other than PtRu systems, but have not reached the commercially acceptable level. PtRu systems having higher activity include supported catalysts in which PtRu fine particles having a reduced particle size and an increased surface area are dispersed on a carbon carrier. However, the activity is still insufficient, with a further increase of activity being needed. It has become possible to increase the power by further reducing the size of PtRu particles (to 5 nm or less) and loading them on a carbon carrier in as much an amount (high loading) and as uniformly (high dispersion) as possible as described above.

It is noted that the amount of PtRu on carbon is represented by a percent loading of the following equation.

Loading (wt %)=[PtRu weight/(PtRu weight+carbon carrier weight)]×100

A lower percent loading requires to bear a more amount of PtRu catalyst, which in turn forms a catalyst layer having a greater thickness. This is detrimental to diffusion of the fuels and reaction products and allows for delamination and spalling of the catalyst layer. Thus a higher percent loading is preferable.

In addition, if PtRu particles agglomerate on carbon (low dispersion), the interior of agglomerates is not available to the reaction. Uniform dispersion (high dispersion) is advantageous because more surface areas are available to the reaction. The inventive catalyst meets these requirements.

Accordingly, the present invention provides an electrolyte membrane-electrode assembly as defined below.

(1) An electrolyte membrane-electrode assembly for direct methanol fuel cells comprising a solid polymer electrolyte membrane sandwiched between a pair of electrodes each comprising a catalyst layer coated on and/or impregnated in a porous support, characterized in that said solid polymer electrolyte membrane is prepared by irradiating a resin membrane with radiation and graft polymerizing a radical polymerizable monomer thereto, the catalyst layer of an anode comprises a catalyst having fine particles of platinum group metal or platinum alloy with a particle size of up to 5 nm supported on carbon particles, and a solid polymer electrolyte, and the catalyst layer of the anode has a noble metal content of up to 5 mg/cm$^2$.

(2) An electrolyte membrane-electrode assembly for direct methanol fuel cells according to (1) wherein the catalyst layer of the anode has a noble metal content of 1 to 3 mg/cm$^2$.

(3) An electrolyte membrane-electrode assembly for direct methanol fuel cells according to (1) or (2) wherein the catalyst supported on carbon is obtained by creating primary metal particles with a particle size of 0.1 to 2 nm on carbon particles, and then loading or growing other metal particles with a particle size of up to 4 nm on surfaces of the primary metal particles.

(4) An electrolyte membrane-electrode assembly for direct methanol fuel cells according to (1), (2) or (3) wherein said solid polymer electrolyte membrane is prepared by irradiating a fluorocarbon membrane with radiation and graft polymerizing a radical polymerizable monomer thereto.

(5) An electrolyte membrane-electrode assembly for direct methanol fuel cells according to (4) wherein the radical polymerizable monomer comprises a radical polymerizable monomer having an alkoxysilyl group.

BENEFITS OF THE INVENTION

Use of the catalyst according to the invention enables construction of a direct methanol fuel cell that uses a higher methanol concentration to produce an increased amount of power.

BRIEF DESCRIPTION OF THE DRAWING

FIG. 1 is a cross-sectional view of an electrolyte membrane-electrode assembly in one embodiment of the invention.

DESCRIPTION OF THE PREFERRED EMBODIMENT

The invention is directed to an electrolyte membrane-electrode assembly for direct methanol fuel cells comprising a solid polymer electrolyte membrane sandwiched between a pair of electrodes each comprising a catalyst layer coated on and/or impregnated in a porous support.

The solid polymer electrolyte membrane used herein is a radiation grafted membrane which is prepared by irradiating a resin membrane with radiation and graft polymerizing a radical polymerizable monomer thereto. Suitable radical polymerizable monomers include styrene, divinylbenzene and the like. In a preferred embodiment, the monomer comprises a radical polymerizable monomer having an alkoxysilyl group, and then a solid polymer electrolyte membrane which has been crosslinked through reaction of alkoxysilyl groups after graft polymerization is obtainable.

The preferred method of preparing a solid polymer electrolyte membrane by graft polymerizing a polymerizable monomer to a radiation-irradiated resin membrane involves the steps of:

irradiating a resin membrane with radiation, graft polymerizing a polymerizable monomer, preferably a polymerizable monomer having an alkoxysilyl group alone or a polymerizable monomer having an alkoxysilyl group and another polymerizable monomer(s) to the irradiated resin membrane, and if the polymerizable monomer having an alkoxysilyl group is graft polymerized, inducing crosslinking through reaction of alkoxysilyl groups, or if the polymerizable monomer is a monomer free of an ion conductive group, introducing ion conductive groups.

The resin membrane used herein is preferably a film or sheet made of fluorocarbon resin. Of fluorocarbon resins, polytetrafluoroethylene, tetrafluoroethylene-perfluoroalkyl vinyl ether copolymers, tetrafluoroethylene-hexafluoropropylene copolymers, and ethylene-tetrafluoroethylene copolymers are preferred for good film properties and amenability to radiation graft polymerization. These resins may be used alone or in any suitable combination.

Also preferably the resin membrane has a thickness of 10 to 200 µm, and more preferably 20 to 100 µm.

The resin membrane is first irradiated with radiation, for example, at room temperature. Preferred species of radiation include electron beam (EB), gamma-ray, and x-ray, with the EB being most preferred. The dose of irradiation depends on the species of radiation, and the type and thickness of the resin membrane. When a fluorocarbon resin membrane as mentioned above is irradiated with EB, for example, the dose is preferably in the range of 1 to 200 kGy, and more preferably 1 to 100 kGy.

Further preferably, irradiation is performed in an inert gas atmosphere such as helium, nitrogen or argon gas. The gas atmosphere preferably has an oxygen concentration of up to 100 ppm, and more preferably up to 50 ppm. Irradiation need not be necessarily done in the absence of oxygen.

Next, a polymerizable monomer is grafted to the irradiated resin membrane.

Preferred polymerizable monomers are monofunctional polymerizable monomers, including styrene monomers such as styrene, α-methylstyrene, and trifluorostyrene; and monomers having ion conductive groups such as sulfonate groups, sulfonamide groups, carboxylate groups, phosphate groups, and quaternary ammonium groups (such as sodium acrylate, sodium acrylamidomethylpropanesulfonate, sodium styrenesulfonate), alone or in any suitable combination. A polyfunctional polymerizable monomer may also be used wherein the difference in reactivity between functional groups may be utilized.

It is preferred to use polymerizable monomers comprising a polymerizable monomer having an alkoxysilyl group.

Examples of the polymerizable monomer having an alkoxysilyl group include vinyltrimethoxysilane, vinyltriethoxysilane, vinyltris(β-methoxyethoxy)silane, γ-acryloxypropylmethyldimethoxysilane, γ-acryloxypropylmethyldiethoxysilane, γ-acryloxypropyltrimethoxysilane, γ-acryloxypropyltriethoxysilane, γ-methacryloxypropylmethyldimethoxysilane, γ-methacryloxypropylmethyldiethoxysilane, γ-methacryloxypropyltrimethoxysilane, γ-methacryloxypropyltriethoxysilane, γ-(acryloxyethoxy)propyltrimethoxysilane, γ-(acryloxyethoxy)propyltriethoxysilane, γ-(methacryloxyethoxy)propyltrimethoxysilane, γ-(methacryloxyethoxy)propyltriethoxysilane, hexenyltrimethoxysilane, hexenyltriethoxysilane, decenyltrimethoxysilane, decenyltriethoxysilane, etc. Inter alia, trimethoxysilylstyrene, triethoxysilylstyrene, vinylbenzyltrimethoxysilane, vinylbenzyltriethoxysilane, vinylphenethyltrimethoxysilane, vinylphenethyltriethoxysilane and other monomers having a vinylphenyl group in the molecule are preferred because the content of alkoxysilyl group within the grafted membrane can be significantly increased. These polymerizable monomers having an alkoxysilyl group may be used alone or in any suitable combination.

The polymerizable monomer having an alkoxysilyl group may be used alone or in combination with a polymerizable monomer free of an alkoxysilyl group as an additional polymerizable monomer.

When a polymerizable monomer having an alkoxysilyl group M1 is used in combination with another polymerizable monomer M2, they may be combined in any appropriate proportion, preferably in a molar ratio M1:M2 between 5/95 and 50:50, and more preferably between 10:90 and 30:70.

The grafting technique may include, for example, immersing an irradiated resin membrane in a solution containing a polymerizable monomer having an alkoxysilyl group and another polymerizable monomer and heating at 50 to 80° C. for 10 to 20 hours in a nitrogen atmosphere. A graft factor of 10 to 100% is preferable.

With regard to the amount of polymerizable monomer to be grafted to the irradiated resin, the polymerizable monomer is preferably used in an amount of 1,000 to 100,000 parts, and more preferably 4,000 to 20,000 parts by weight per 100 parts by weight of the resin film. Less amounts of the monomer may lead to insufficient contact whereas excessive amounts of the monomer may inhibit efficient utilization of the monomer.

In graft polymerizing the polymerizable monomer, a polymerization initiator such as azobisisobutyronitrile may be used as long as the object of the invention is not impaired.

Further, a solvent may be used during the graft reaction. Preferred solvents are those in which the monomers are uniformly dissolvable, and include ketones such as acetone and methyl ethyl ketone; esters such as ethyl acetate and butyl acetate; alcohols such as methyl alcohol, ethyl alcohol, propyl alcohol, and butyl alcohol; ethers such as tetrahydrofuran and dioxane; N,N-dimethylformamide and N,N-dimethylacetamide; aromatic hydrocarbons such as benzene, toluene and xylene; aliphatic or alicyclic hydrocarbons such as n-heptane, n-hexane, and cyclohexane, and mixtures thereof. A ratio of monomer to solvent (by weight) is desirably from 0.01 to 1. A monomer/solvent ratio (by weight) in excess of 1 may make it difficult to control the number of monomer units in the graft chain whereas a ratio less than 0.01 may lead to too low a graft factor. The more desired ratio is from 0.03 to 0.5.

In the embodiment wherein the monomer having an alkoxysilyl group is grafted, the thus grafted resin membrane is then crosslinked through reaction, for example, hydrolysis and dehydration condensation, of alkoxysilyl groups. Hydrolysis may be effected, for example, by immersing the grafted resin membrane in a mixed solution of hydrochloric acid and dimethylformamide (DMF) at room temperature for 10 to 20 hours. Dehydration condensation may be effected, for example, by heating the hydrolyzed resin membrane at 100 to 200° C. for a certain time (typically 2 to 8 hours) in an inert gas atmosphere under a reduced pressure (typically 1 to 10 Torr) or atmospheric pressure. To help the reaction proceed under mild conditions, a tin-based catalyst such as dibutyltin dilaurate may be used.

In the other embodiment wherein the monomer free of an ion conductive group (e.g., styrene monomers as described above) is used, ion conductive groups such as sulfonate groups, carboxylate groups and quaternary ammonium salt groups are introduced into the graft chains, yielding a solid polymer electrolyte membrane within the scope of the invention. Introduction of sulfonate groups may be done as in the prior art. For example, the membrane may be sulfonated by contact with chlorosulfonic acid or fluorosulfonic acid. Understandably, if sulfonation precedes dehydration condensation, then hydrolysis may be omitted.

Also, the grafted resin membrane may be further increased in crosslinked density by immersing it in an alkoxysilane, and effecting co-hydrolysis and co-dehydration condensation together with alkoxysilyl groups on the graft chains. Suitable alkoxysilanes include tetramethoxysilane, tetraethoxysilane, methyltrimethoxysilane, methyltriethoxysilane, phenyltrimethoxysilane, phenyltriethoxysilane, dimethyldimethoxysilane, dimethyldiethoxysilane, etc. The alkoxysilane is preferably used in an amount of 1,000 to 10,000 parts by weight per 100 parts by weight of the resin membrane so that the resin membrane may be impregnated with 0.1 to 20% by weight of the alkoxysilane.

In the invention, electrodes serving as an anode (fuel electrode) and a cathode (air electrode) are joined to the solid polymer electrolyte membrane defined above. The electrodes used herein comprise a porous support and a catalyst layer. For the porous support, carbon paper, carbon cloth or the like is preferably used. Also preferably the catalyst layer comprises catalyst particles and a solid polymer electrolyte.

The catalyst particles used herein are platinum group metal fine particle catalysts and platinum alloy fine particle catalysts. The platinum group metal fine particle catalysts include platinum, ruthenium and the like. The platinum alloy fine particle catalysts include alloys of platinum with at least one metal selected from among ruthenium, palladium, rhodium, iridium, osmium, molybdenum, tin, cobalt, nickel, iron, chromium and the like. The platinum alloy should preferably contain at least 5%, and more preferably at least 10% by weight of platinum.

The catalyst layer of the anode comprises a catalyst having fine particles of platinum group metal or platinum alloy with a particle size of up to 5 nm, specifically 1 to 5 nm, supported on carbon particles, and a solid polymer electrolyte, and the catalyst layer of the anode has a noble metal content of up to 5 mg/cm$^2$, specifically 1 to 3 mg/cm$^2$.

It is noted that the particle size (or average particle size) is as observed under a transmission electron microscope (TEM).

The anode catalyst, which serves to take out current flow by methanol oxidation reaction, is composed mainly of PtRu so that reaction takes place on surfaces of PtRu particles. Thus, the smaller the PtRu particle size, the greater becomes the surface area per weight of PtRu particles, and so the activity. In the case of a catalyst supported on carbon, because the carbon has a substantial volume, the thickness of a catalyst layer formed therefrom depends on the amount of carbon used. To facilitate diffusion of fuels and reaction products, a thinner catalyst layer is preferable. To this end, it is desirable to load carbon particles with PtRu as much as possible (high loading). If carbon is loaded with PtRu particles in agglomerated form, the interior of agglomerates is not available to reaction. It is then desirable that PtRu particles be loaded in high dispersion without agglomeration.

It is desired to use a catalyst having PtRu fine particles with a particle size of up to 5 nm, preferably up to 4 nm, and more preferably up to 3 nm, supported on carbon black. More preferably, the catalyst supported on carbon is obtained by creating primary metal particles (typically Pt) with a particle size of 0.1 to 2 nm on carbon particles, and then loading or growing other metal particles (typically PtRu) with a particle size of up to 4 nm on surfaces of the primary metal particles, the resulting catalyst being referred to as "two-stage supported catalyst."

The two-stage supported catalyst is described in further detail. By creating metal particles (e.g., Pt) with a particle size of about 0.1 to 2 nm on carbon, and then loading or growing PtRu on the Pt nuclei, a catalyst having a high percent loading and high dispersion is obtainable. In the first stage, Pt nuclei are formed to a size of up to 2 nm. With a nucleus size in excess of 2 nm, the eventually formed catalyst particles have a larger size and are prone to agglomerate, failing to yield a high dispersion catalyst. Nucleus formation to a size equal to or less than 2 nm ensures an enhanced bond to the carrier and facilitates uniform dispersion on carbon. On Pt nuclei resulting from the first stage, PtRu is loaded or grown, yielding a catalyst having a high loading and high dispersion. The finally formed PtRu particles have a particle size of up to 4 nm, preferably up to 3 nm, and more preferably up to 2 nm. A particle size in excess of 4 nm is equal to or more than the particle size of commercially available catalyst TEC61E54 (Tanaka Kikinzoku Kogyo K.K.) and sometimes fails to exert the activity enhancement effect.

In the first stage, Pt nucleus formation may be carried out, for example, by adding chloroplatinic acid to a dispersion of carbon in water, further adding ethylene glycol and NaOH thereto, agitating and heating at 70 to 100° C. for 1 to 12 hours, then filtering, washing and drying, thereby yielding carbon having Pt nuclei supported thereon. Herein, chloroplatinic acid is preferably used in an amount to provide 3 to 50 parts by weight of metallic platinum per 100 parts by weight of carbon so that carbon may have a Pt loading of 3 to 30% by weight. Notably, the amount of ethylene glycol used is 5 to 50% by weight of the aqueous solution, and the amount of NaOH used is preferably such that the aqueous solution prior to heating may have a pH value in the range of 7 to 12.

Then the carbon having Pt nuclei supported thereon is admitted into a solution of chloroplatinic acid and ruthenium chloride in ethanol, and heated under reflux at 70 to 100° C. for 1 to 12 hours, thereby loading the carbon with PtRu.

In the second stage, preferably chloroplatinic acid is used in an amount to provide 3 to 300 parts by weight of metallic platinum per 100 parts by weight of carbon and ruthenium chloride is used in an amount to provide 3 to 600 parts by weight of metallic ruthenium per 100 parts by weight of carbon, so that carbon may have a PtRu loading of 20 to 80% by weight. Also preferably the amount of ethanol used is 5 to 50% by weight of the aqueous solution.

On the other hand, the catalyst layer of the cathode is preferably a catalyst having Pt or Pt-transition metal alloy particles supported on carbon, or platinum black or platinum alloy black not supported on carbon. The catalyst layer of the cathode preferably has a noble metal content of 1 to 5 mg/cm$^2$, specifically 1 to 3 mg/cm$^2$.

It is understood that the more the catalyst amount, the more is the area available to methanol oxidation reaction, and hence, the more is produced the power. At the same time, however, the catalyst layer has an increased thickness, which may interfere with diffusion of methanol fuel and reaction products ($CO_2$ and the like). For this reason, an increased catalyst amount brings the tendency that the power becomes gradually saturated.

Examples of the solid polymer electrolyte which can be used herein include perfluoro electrolytes as typified by Nafion, hydrocarbon electrolytes as typified by styrene-sulfonic acid-butadiene copolymers, and inorganic/organic hybrid electrolytes as typified by co-polycondensates between sulfonate group-containing alkoxysilanes and terminally silylated organic oligomers.

Further, inorganic oxide fine particles such as silica and titania may be compounded for the purpose of imparting hydrophilicity.

Notably, to the catalyst paste from which the catalyst layer is formed, a solvent may be added for the purpose of improving coating operation when the catalyst paste is applied to the electrode and/or electrolyte membrane. The preferred solvents are those in which alkoxysilanes having an ion conductive group or hydrolysates thereof and polyethers having alkoxysilyl groups bonded at both ends of the molecular chain via a bond selected from an amido bond, urethane bond, and urea bond are uniformly dissolvable, including alcohols such as methyl alcohol, ethyl alcohol, n-propyl alcohol, isopropyl alcohol, n-butyl alcohol, ethylene glycol, glycerol; ketones such as acetone and methyl ethyl ketone; esters such as ethyl acetate and butyl acetate; ethers such as tetrahydrofuran and dioxane; aromatic hydrocarbons such as benzene and toluene; aliphatic or alicyclic hydrocarbons such as n-heptane, n-hexane and cyclohexane; and polar solvents such as water, dimethyl sulfoxide, N,N-dimethylformamide, N,N-dimethylacetamide, formamide, N-methylformamide, N-methylpyrrolidone, ethylene carbonate, and propylene carbonate. These solvents may be used alone or in admixture of two or more. Of these, polar solvents such as isopropyl alcohol, water, and N,N-dimethylformamide are desirable.

Also a fluorocarbon resin can be added to the paste in order to increase the porosity of the catalyst layer to facilitate transportation of water. Suitable fluorocarbon resins include polytetrafluoroethylene (PTFE), tetrafluoroethylene-hexafluoropropylene copolymers (FEP), tetrafluoroethylene-perfluoroalkyl vinyl ether copolymers (PFA), polychlorotrifluoroethylene (PCTFE), ethylene-tetrafluoroethylene copolymers (ETFE), polyvinylidene fluoride (PVDF), polyvinyl fluoride (PVF), trifluoroethylene-ethylene copolymers (ECTFE), which may be used alone or in combination of two or more. As the fluorocarbon resin, commercially available resins having a number average molecular weight of the order of 100,000 to 600,000 as measured by GPC versus polystyrene standards may be used.

Although the amounts of the foregoing components used vary over a wide range, the preferred amounts are 10 to 1,000 parts by weight of the solid polymer electrolyte, 0 to 5,000 parts by weight, more specifically 100 to 1,000 parts by weight of the solvent, and 10 to 400 parts by weight, more specifically 40 to 130 parts by weight of the fluorocarbon resin, relative to 100 parts by weight of the catalyst particles.

From the catalyst paste described above, a catalyst layer is formed in a standard way by coating the paste onto the electrolyte membrane or porous electrode substrate, and if the solvent has been added to the paste, removing the solvent.

After the catalyst layer is formed on at least one of the electrolyte membrane and the electrode substrate, a membrane-electrode assembly may be prepared by sandwiching the electrolyte membrane on opposite surfaces between electrode substrates and hot pressing them together. While the hot pressing temperature may be selected as appropriate depending on the type and blend ratio of components and fluorocarbon resin in the electrolyte membrane or catalyst paste used, the desired temperature range is from 50 to 200° C., and more desirably 80 to 180° C. Temperatures below 50° C. may provide an insufficient bond whereas temperatures above 200° C. may cause degradation of the resin component in the electrolyte membrane or catalyst layer. While the applied pressure level may be selected as appropriate depending on the type and blend ratio of components and fluorocarbon resin in the electrolyte membrane and/or catalyst paste and the type of porous electrode substrate, the desired pressure range is from 1 to 100 kgf/cm$^2$, and more desirably 10 to 100 kgf/cm$^2$. Pressures below 1 kgf/cm$^2$ may provide an insufficient bond whereas pressures above 100 kgf/cm$^2$ may reduce the porosity of the catalyst layer and electrode substrate, leading to degraded performance.

FIG. 1 illustrates an electrolyte membrane-electrode assembly fabricated in this way. Illustrated in FIG. 1 are a cathode (air electrode) 1 consisting of a porous electrode substrate 2 of carbon paper, carbon cloth or the like and a catalyst layer 3, an anode (fuel electrode) 4 consisting of a porous electrode substrate 5 of carbon paper, carbon cloth or the like and a catalyst layer 6, and a solid polymer electrolyte membrane 7. It is noted that water repellent layers may intervene between catalyst layer 3 and porous electrode substrate 2 and between catalyst layer 6 and porous electrode substrate 5, respectively.

A direct methanol fuel cell using the electrolyte membrane-electrode assembly of the invention is constructed in accordance with the standard technique except that the electrolyte membrane-electrode assembly described herein is used. In the fuel cell, the methanol aqueous solution fuel to be fed to the fuel electrode may have a methanol concentration of at least 3% by weight, preferably at least 10% by weight, and more preferably at least 30% by weight based on the fuel. Such a high methanol concentration allows for size reduction of the fuel tank, achieving a higher energy density. The methanol concentration may be 100% by weight at maximum.

EXAMPLE

Examples and Comparative Examples are given below for illustrating the invention, but the invention is not limited thereto.

Example 1

Membrane-Electrode Assembly of Radiation-Grafted Membrane and Two-Stage Supported Catalyst

[Preparation of Radiation-Grafted Membrane]

Using a low voltage EB irradiation system (Light Beam L, Iwasaki Electric Co., Ltd.), an ethylene-tetrafluoroethylene copolymer membrane (ETFE membrane, Norton) dimensioned 5 cm×6 cm×25 μm (thick) was irradiated in a nitrogen atmosphere with electron beam in a dose of 2 kGy (accelerating voltage 100 kV). The EB-irradiated ETFE membrane was placed in a 25-mL test tube equipped with a three-way cock, which was charged with 7.8 g of styrene (St), 4.2 g of trimethoxysilylstyrene (MOSS), 0.003 g of azobisisobutyronitrile (AIBN), and 12 g of toluene. Nitrogen was bubbled into the test tube at room temperature for 1 hour, after which with the three-way cock closed, graft polymerization took place for 16 hours in an oil bath at 63° C. The graft factor was 22.7%.

Separately, 3 g of 2M HCl and 22 g of dimethylformamide (DMF) were mixed to form a HCl/H$_2$O+DMF solution.

The St/MOSS co-grafted membrane and the HCl/H$_2$O+DMF solution were admitted in a 500-mL beaker where hydrolysis took place at room temperature for 12 hours. Next, the St/MOSS co-grafted membrane was heated at 200° C. under a reduced pressure (5 Torr) for 6 hours for effecting dehydration condensation and crosslinking, obtaining a St/MOSS co-grafted/crosslinked membrane.

Chlorosulfonic acid and dichloroethane were mixed to form a 0.2M chlorosulfonic acid/dichloroethane solution. The St/MOSS co-grafted/crosslinked membrane and the 0.2M chlorosulfonic acid/dichloroethane solution were fed to a 500-mL separable flask equipped with a Dimroth condenser, after which in an oil bath at 50° C., sulfonation took place for 6 hours. This was followed by washing with dichloroethane and deionized water and vacuum drying at 100° C. for 2 hours. The thus chlorosulfonated St/MOSS co-grafted/crosslinked membrane was immersed in deionized water at 50° C. for 24 hours, yielding a H type electrolyte membrane.

The H type electrolyte membrane had a proton conductivity of 0.08 S/cm as measured at 25° C. by the AC impedance method, and a coefficient of methanol permeation of 8.6×10$^{-8}$ m$^2$/h.

[Preparation of PtRu/C Catalyst]

To 500 mL of water dispersion containing 5 g of carbon carrier (Ketjen Black EC300J), chloroplatinic acid containing 0.6 g of platinum was added, and 500 g of ethylene glycol and 50 mmol of NaOH were then added. With stirring, the mixture was heated at 60° C. for 24 hours. It was filtered, washed, and dried at 80° C. for 24 hours, obtaining carbon having Pt nuclei supported thereon.

The carbon having Pt nuclei supported thereon was observed under TEM, confirming the state that fine particles with a size of about 0.5 nm were uniformly dispersed on the carrier.

The carbon having Pt nuclei supported thereon was admitted into a solution containing chloroplatinic acid, ruthenium chloride and ethanol and heated under reflux at 80° C. for 8 hours, yielding a catalyst having a PtRu loading of 54% by weight. A TEM observation demonstrated that particles with a size of 3 nm were uniformly dispersed on carbon.

[Preparation of Anode Using PtRu/C Catalyst]

A catalyst paste was prepared by mixing 5 g of the PtRu/C catalyst with 11.8 g of a 20 wt % Nafion solution (DuPont), 20 g of water, and 20 g of 2-propanol. The paste was applied onto water repellent treated carbon paper (TGP-H-060, Toray) using a wire bar, and dried at 60° C. for 1 hour in a circulating hot air oven, forming a catalyst layer for anode. While the amount of PtRu was controlled by changing the type of wire bar, electrodes having the catalyst layer with a PtRu loading of 1, 3 and 5 mg/cm$^2$ were obtained. Electrodes with a PtRu loading of more than 5 mg/cm$^2$ could not be prepared because the catalyst layer peeled off.

[Preparation of Cathode Using Pt Black Catalyst]

A catalyst paste was prepared by mixing 5 g of a 20 wt % Nafion solution (DuPont), 10 g of water, 5 g of platinum black (HiSPEC 1000, Johnson Matthey) and 5 g of 1-propanol. The paste was applied onto water repellent treated carbon paper (TGP-H-060, Toray) using a wire bar, and dried at 60° C. for 1 hour in a circulating hot air oven, forming a catalyst layer for cathode. A cathode with a Pt loading of 1 mg/cm$^2$ was obtained.

[Preparation of Electrolyte Membrane-Electrode Assembly]

The anode and cathode were cut to square pieces of 5 cm$^2$. The membrane was sandwiched between the anode and cathode pieces such that the catalyst layers on the electrodes faced each other, and held at 150° C. under a pressure of 50 kgf/cm$^2$ for 30 minutes, yielding an electrolyte membrane-electrode assembly. In this way, electrolyte membrane-electrode assemblies were fabricated in which the PtRu loading on the anode was varied and the Pt loading on the cathode was fixed.

Example 2

Membrane-Electrode Assembly of Radiation-Grafted Membrane and 4-5 nm Particle Size PtRu Supported Catalyst A radiation-grafted membrane was prepared as in Example 1.

[Preparation of Anode Using PtRu/C Catalyst with a Particle Size of 4-5 nm] A catalyst paste was prepared by mixing 11.8 g of a 20 wt % Nafion solution (DuPont), 20 g of water, 5 g of PtRu/C having a particle size of 4 to 5 nm and a PtRu loading of 53% by weight (TEC61E54, Tanaka Kikinzoku) and 20 g of 2-propanol. The paste was applied onto water repellent treated carbon paper (TGP-H-060, Toray) using a wire bar, and dried at 60° C. for 1 hour in a circulating hot air oven, forming a catalyst layer for anode. While the amount of PtRu was controlled by changing the type of wire bar, electrodes having the catalyst layer with a PtRu loading of 1, 3 and 5 mg/cm² were obtained. Electrodes with a PtRu loading of more than 5 mg/cm² could not be prepared because the catalyst layer peeled off.

The cathode used herein was the cathode with Pt black catalyst in Example 1.

An electrolyte membrane-electrode assembly was fabricated as in Example 1, using the anode with PtRu/C catalyst and the cathode with Pt black catalyst. In this way, an electrolyte membrane-electrode assembly was fabricated in which the PtRu loading on the anode was equal to the Pt loading on the cathode. Electrolyte membrane-electrode assemblies were also fabricated in which the PtRu loading on the anode was varied and the Pt loading on the cathode was fixed.

Comparative Example 1

Membrane-Electrode Assembly of Nafion Membrane and Two-Stage Supported Catalyst

[Preparation of Nafion Membrane]

Nafion 117 membrane (DuPont) dimensioned 7 cm×7 cm×175 μm (thick) was pre-treated as follows. First, it was immersed in 3% $H_2O_2$ aqueous solution at 80° C. for 1 hour, then in 0.5M $H_2SO_4$ at 80° C. for 1 hour. It was then washed with deionized water at 80 LC for 1 hour. After repeating the washing three times, it was held in deionized water at room temperature.

The membrane had a proton conductivity of 0.08 S/cm as measured at 25° C. by the AC impedance method, and a coefficient of methanol permeation of $3.1 \times 10^{-7}$ m²/h.

A membrane-electrode assembly was fabricated as in Example 1, using the anode with two-stage supported PtRu/C catalyst and the cathode with Pt black catalyst.

Evaluation of Properties

Each of the membrane-electrode assemblies in Examples 1 and 2 and Comparative Example 1 was installed in a test cell (Electrochem, Inc.). By feeding 1M methanol aqueous solution to the anode side and dry air to the cathode side, current-voltage relationship was determined at a cell temperature of 30° C.

From the performance curve thus obtained, a maximum power density was computed for determining a change of maximum power density with catalyst content. The results are shown in Table 1.

TABLE 1

| | Maximum power density (mW/cm²) | | |
|---|---|---|---|
| Catalyst content on anode (mg/cm²) | 1 | 3 | 5 |
| Catalyst content on cathode (mg/cm²) | 1 | 1 | 1 |
| Example 1 | 35 | 45 | 46 |
| Example 2 | 27 | 36 | 37 |
| Comparative Example 1 | 22 | 30 | 31 |

As seen from Examples 1 and 2, the maximum power density increased with the increasing anode catalyst content, but the power plateaued at about 3 mg/cm² and remained substantially unchanged even when the content was further increased. At the same catalyst content, the maximum power density became outstanding when the two-stage supported catalyst was used.

As seen from Example 1 and Comparative Example 1, the grafted membrane with silane crosslinkage provided a higher maximum power density and took more advantage of increased catalyst content than the Nafion membrane.

The invention claimed is:

1. An electrolyte membrane-electrode assembly for a direct methanol fuel cell, comprising a solid polymer electrolyte membrane sandwiched between a pair of electrodes each comprising a catalyst layer coated on and/or impregnated in a porous support, wherein said solid polymer electrolyte membrane is prepared by irradiating a resin membrane with radiation and graft polymerizing a radical polymerizable monomer thereto: that the catalyst layer of an anode comprises a catalyst having fine particles of platinum group metal or platinum alloy with a particle size of up to 5 nm supported on carbon particles, and a solid polymer electrolyte: that the catalyst layer of the anode has a noble metal content of up to 5 mg/cm²: and that the catalyst comprises primary metal particles with a particle size of 0.1 to 2 nm on carbon particles, and particles of a different metal with a particle size of up to 4 nm on surfaces of the primary metal particles, and wherein the catalyst comprises Pt particles with a particle size of 0.1 to 2 nm on carbon particles, and PtRu on surfaces of the Pt nuclei to a particle size of up to 4 nm.

2. An electrolyte membrane-electrode assembly according to claim 1 wherein the catalyst layer of the anode has a noble metal content of 1 to 3 mg/cm².

3. An electrolyte membrane-electrode assembly according to claim 1, wherein said solid polymer electrolyte membrane is prepared by irradiating a fluorocarbon membrane with radiation and graft polymerizing a radical polymerizable monomer thereto.

4. An electrolyte membrane-electrode assembly direct methanol fuel cells according to claim 3, wherein the radical polymerizable monomer comprises a radical polymerizable monomer having an alkoxysilyl group.

5. An electrolyte membrane-electrode assembly according to claim 4 wherein said radical polymerizable monomer having an alkoxysilyl group is trimethoxysilylstyrene, triethoxysilylstyrene, vinylbenzyltrimethoxysilane, vinylbenzyltriethoxysilane, vinylphenethyltrimethoxysilane or vinylphenethyltriethoxysilane.

6. An electrolyte membrane-electrode assembly according to claim 4, wherein said radical polymerizable monomer having an alkoxysilyl group has a vinylphenyl group.

7. An electrolyte membrane-electrode assembly according to claim 4, wherein said graft polymerizing is carried out with (1) said radical polymerizable monomer having an alkoxysilyl group in combination with (2) a radical polymerizable monomer free of an alkoxysilyl group.

8. An electrolyte membrane-electrode assembly according to claim 7 wherein the molar ratio of (1) to (2) is from 5:95 to 50:50.

9. An electrolyte membrane-electrode assembly according to claim 7 wherein the molar ratio of (1) to (2) is from 10:90 to 30:70.

10. An electrolyte membrane-electrode assembly according to claim 4, wherein the fluorocarbon membrane has been immersed in an alkoxysilane, and co-hydrolysis and co-dehydration condensation together has been effected with alkoxysilyl groups on the graft chains.

11. An electrolyte membrane-electrode assembly according to claim 10, wherein the alkoxysilane is tetramethoxysilane, tetraethoxysilane, methyltrimethoxysilane, methyltriethoxysilane, phenyltrimethoxysilane, phenyltriethoxysilane, dimethyldimethoxysilane, or dimethyldiethoxysilane.

12. An electrolyte membrane-electrode assembly according to claim 10, wherein the alkoxysilane is applied in an amount of 1,000 to 10,000 parts by weight per 100 parts by weight of the fluorocarbon membrane.

13. An electrolyte membrane-electrode assembly according to claim 12, wherein the fluorocarbon membrane has been impregnated with 0.1 to 20% by weight of the alkoxysilane.

14. An electrolyte membrane-electrode assembly according to claim 1, wherein said solid polymer electrolyte membrane is prepared by
irradiating a resin membrane with radiation,
graft polymerizing a polymerizable monomer having an alkoxysilyl group alone or a polymerizable monomer having an alkoxysilyl group and another polymerizable monomer to the irradiated resin membrane, and
if the polymerizable monomer having an alkoxysilyl group is graft polymerized, inducing crosslinking through reaction of alkoxysilyl groups, or
if the polymerizable monomer is a monomer free of an ion conductive group, introducing ion conductive groups.

15. An electrolyte membrane-electrode assembly according to claim 1 wherein a fluorocarbon resin is added to the catalyst layer.

16. An electrolyte membrane-electrode assembly according to claim 1, wherein said solid polymer electrolyte membrane is prepared by irradiating a fluorocarbon membrane with radiation and graft polymerizing a radical polymerizable monomer thereto.

17. An electrolyte membrane-electrode assembly according to claim 16, wherein the radical polymerizable monomer comprises a radical polymerizable monomer having an alkoxysilyl group.

18. An electrolyte membrane-electrode assembly for a direct methanol fuel cell, comprising a solid polymer electrolyte membrane sandwiched between a pair of electrodes each comprising a catalyst layer coated on and/or impregnated in a porous support, wherein
said solid polymer electrolyte membrane is prepared by irradiating a membrane with radiation and graft polymerizing a radical polymerizable monomer thereto: that the catalyst layer of an anode comprises a catalyst having fine particles of platinum group metal or platinum alloy with a particle size of up to 5 nm supported on carbon particles, and a solid polymer electrolyte: that the catalyst layer of the anode has a noble metal content of substantially more than 3 mg/cm$^2$ and up to 5 mg/cm$^2$, and that the catalyst comprises primary metal particles with a particle size of 0.1 to 2 nm on carbon particles, and particles of a different metal with a particle size of up to 4 nm on surfaces of the primary metal particles,
and wherein the catalyst comprises Pt particles with a particle size of 0.1 to 2 nm on carbon particles, and PtRu on surfaces of the Pt nuclei to a particle size of up to 4 nm.

\* \* \* \* \*